United States Patent [19]
Ohzu et al.

[11] Patent Number: 5,544,191
[45] Date of Patent: Aug. 6, 1996

[54] METAL VAPOR LASER CAPABLE OF COLD OPERATION

[75] Inventors: Akira Ohzu; Takashi Arisawa; Masaaki Kato; Yoji Suzuki, all of Ibaraki-ken, Japan

[73] Assignee: Japan Atomic Energy Research Institute, Tokyo, Japan

[21] Appl. No.: 251,249

[22] Filed: May 31, 1994

[30] Foreign Application Priority Data

Aug. 16, 1993 [JP] Japan .................................. 5-202371

[51] Int. Cl.$^6$ ....................................................... H01S 3/22
[52] U.S. Cl. ................... 372/56; 372/69; 372/76; 372/34
[58] Field of Search .................. 372/56, 60, 55, 372/34, 76

[56] References Cited

U.S. PATENT DOCUMENTS 4,945,545  7/1990  Piper ......................................... 372/56

OTHER PUBLICATIONS

"Gas and Metal Vapor Lasers and Applications," *SPIE Proceedings*, vol. 1412, pp. 2–11, (1991).

*Primary Examiner*—Leon Scott, Jr.
*Attorney, Agent, or Firm*—Banner & Allegretti, Ltd.

[57] ABSTRACT

The improved metal vapor laser capable of cold operation performs plasma etching on a vaporizing metal within a laser tube in the presence of a reactive gas so that the metal is vaporized at temperatures below its boiling point to effect laser oscillation. The laser can be operated at much lower temperatures than a conventional hot-operating version which produces metal vapors by thermal evaporation; in addition, the laser will experience a smaller heat loss while undergoing limited thermal damage to its structural members; further, laser light can be oscillated to produce high output power and, at the same time, the warmup time can be shortened significantly.

6 Claims, 2 Drawing Sheets

METAL VAPOR LASER CAPABLE OF COLD OPERATION

BACKGROUND OF THE INVENTION:

This invention relates to a metal vapor laser capable of cold operation, or operation at low temperatures. The laser holds promise for use as a light source with apparatus that use high-power lasers, among which a dye laser apparatus for isotope separation, a vapor deposition apparatus that depends on laser ablation and a laser-dependent metal processing machine are worth particular mention.

Thus, the present invention relates to a metal vapor laser that can be operated at much lower temperatures than the conventional high-temperature version which produces metal vapors by thermal evaporation; because of its cold working environment, the laser of the present invention experiences smaller degradation of laser power due to temperature while undergoing limited thermal damage to its structural components; as a result, laser light can be oscillated to produce high output power and, at the same time, the warmup time can be shortened significantly.

Metal vapors for use in metal vapor lasers have heretofore been generated at either high or low temperature. In the first case, the interior of a laser tube is maintained at high temperature (e.g., about 1500° C. in the case of copper vaporization) by either discharge or electric heating so as to generate metal vapors. However, this approach has had several drawbacks such as, thermal deterioration of structural components by high temperature and the long warmup time to laser oscillation.

In the second case, there is the need to synthesize a rare gas, or a metal halide gas, which is directly used as a laser medium; in addition, the metal halide gas is decomposed to release the metal for laser oscillation but the laser thus produced does not have satisfactory power.

To raise the temperature in the laser tube to a sufficiently high level to produce metal vapors, a heat insulator or the like is used so that the heat resulting from discharge is accumulated in the tube to heat the metal or, alternatively, tile metal is directly heated with an oven in the laser tube. In either way, the method suffers from the disadvantage that an expensive heat insulator and ceramic tube that can withstand elevated temperatures have to be used in order to maintain a high temperature within the laser tube and, what is more, the need to cool those parts adds considerably to the complexity of the overall system. Another problem with raising the temperature in the laser tube is that population rate of lower energy levels of electron for laser oscillation by the atoms of metal vapors are thermally increased and the probability for population inversion decreases to lower the efficiency of laser oscillation. As is well known, laser oscillation utilizes that is generated when the energy state of an atom emission makes transition from a higher level to a lower level. At elevated temperatures, the proportion of atoms In the lower energy state will increase so much as to reduce the probability for population inversion (i.e., the condition in which the higher energy levels are more populated than the lower levels).

As a further problem, the method takes so much time to produce the desired temperature that as many as 1 to 2 hours are necessary to achieve laser oscillation. If a heater is to be used, it must be deliverately installed within the laser tube for producing metal vapors and a puddle of metal has to be heated as if it were in an oven. This also adds to the complexity of the system and yet it is difficult to produce the metal vapors uniformly within the laser tube.

As already mentioned, the second approach using a metal halide gas has suffered from disadvantages such as the need to prepare a special gas and low output power due to the low efficiency. To solve this problem, it has been necessary to perform the following special technique:

a hydrogen halide is introduced into a laser discharge tube, in which pure metal is settled and a metal halide compound is generated as a metal halide gas is evaporated while, at the same time, the metal halide vapor is composed by discharge to generate metallic atoms which will serve as a laser medium.

SUMMARY OF THE INVENTION

Hence, the present invention has been accomplished in order to attain the following objectives:

(1) To develop a technique for generating the vapors of a metal vapor at low temperatures with use of plasma etching without heating the laser tube to high temperatures;

(2) To develop a technique for shortening the time to laser oscillation;

(3) To develop a technique for enhancing the efficiency of laser oscillation while reducing the thermal loss of the discharge tube;

(4) To develop a technique for enhancing the output power of a laser;

(5) To develop a technique for generating metal vapors as a laser medium with a halogen compound being produced and decomposed simultaneously within a laser tube; and (6) To develop a technique by which compact laser equipment can be fabricated at low cost, using a smaller size of heat shield in the discharge tube.

In accordance with the present invention, a reactive gas such as a halogen gas (e.g., Cl gas) which is typically used in semiconductor processes is introduced into a laser tube so it is subjected to laser oscillation and, then, the gas is caused to enter into a chemical reaction or plasma etching with a pure metal within the tube, with the metal being subsequently vaporized at a much lower temperature than the boiling point of the metal, whereby the vapors of the metal are easily generated at low temperature within the laser tube.

DETAILED DESCRIPTION OF THE INVENTION

Figure 1:
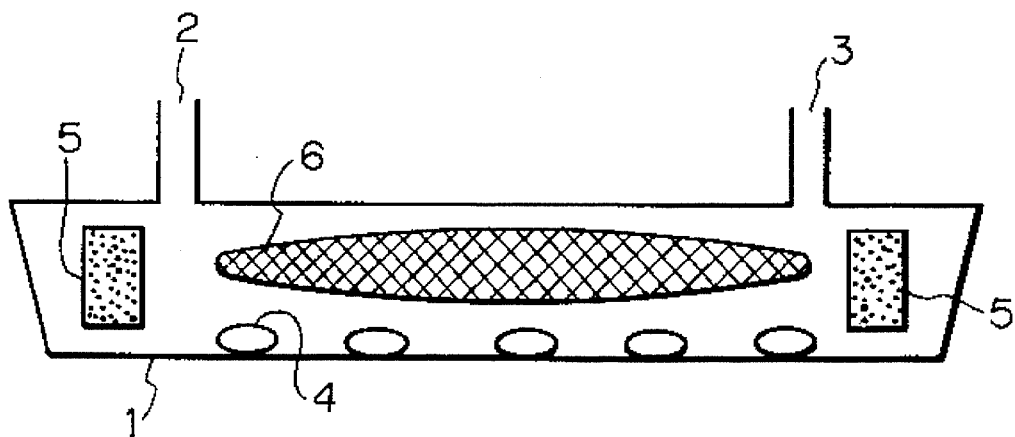
FIG. 1 is a diagram showing the metal vapor laser of the present invention capable of cold operation.

FIG. 1 shows a metal vapor laser that depends on plasma etching for cold operation in accordance with the present invention. Shown by 1 is a laser tube having both a gas inlet 2 and a gas outlet 3. Shown by 4 is a piece of metal that is placed in the laser tube for reaction of metal and hydrogen halide. Shown by 5 Is an electrode provided at each end of the laser tube, and 6 refers to the plasma generated between electrodes 5.

For laser oscillation, a gaseous mixture of a rare gas such as argon or helium and a hydrogen halide is introduced into the laser tube 1 through the inlet 2 and the interior of the laser tube 1 is evacuated to maintain a constant internal gas pressure while electric discharge is effected between electrodes 5 to generate plasma 6. The metal piece 4 on the bottom of the laser tube reacts with the generated plasma and the resulting plasma etching action causes the atoms of the metal. The density of vaporized metallic atoms will increase in the laser tube by sufficient degree to cause laser oscillation, whereupon laser light of high power is produced efficiently at low temperature.

In accordance with the present invention, the metal in the laser tube reacts with a halogen or hydrogen halide gas under electric discharge, whereupon plasma etching or other etching effects occur to have the compound of interest suspended within the laser tube while, at the same time, it is decomposed by the same electric discharge to evaporate the metal at low temperature uniformly within the laser tube; further, the vaporized atoms of the metal are excited by the electric discharge to such an extent that laser oscillation will take place.

The present invention is described below with reference to a specific example.

EXAMPLE

The present Invention was implemented using a copper vapor laser as the metal vapor laser. Hydrogen bromide (HBr) as a hydrogen fluoride gas having high reactivity with the metal to be vaporized was mixed in 5% with a buffer gas (neon) and the mixture was introduced into the laser tube. The laser tube had an aperture diameter of about 38 mm and a length of 1200 mm, with laser pulses being emitted at a repetition rate of 6 kHz. About 20 min after power was on, an output of about 18 W was attained at a temperature of about 500°–600° C. in the laser tube.

Figure 2:
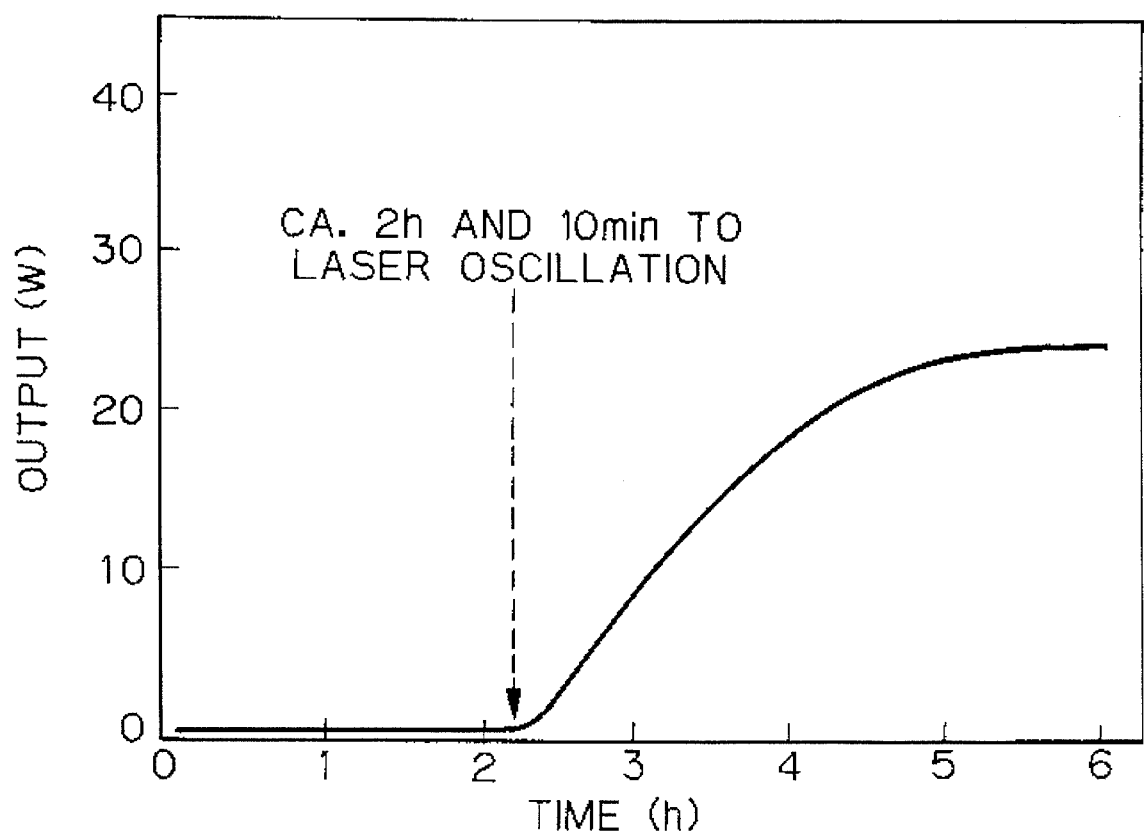
FIG. 2 is a graph showing the time to laser oscillation of a conventional copper vapor laser for hot operation.
Figure 3:
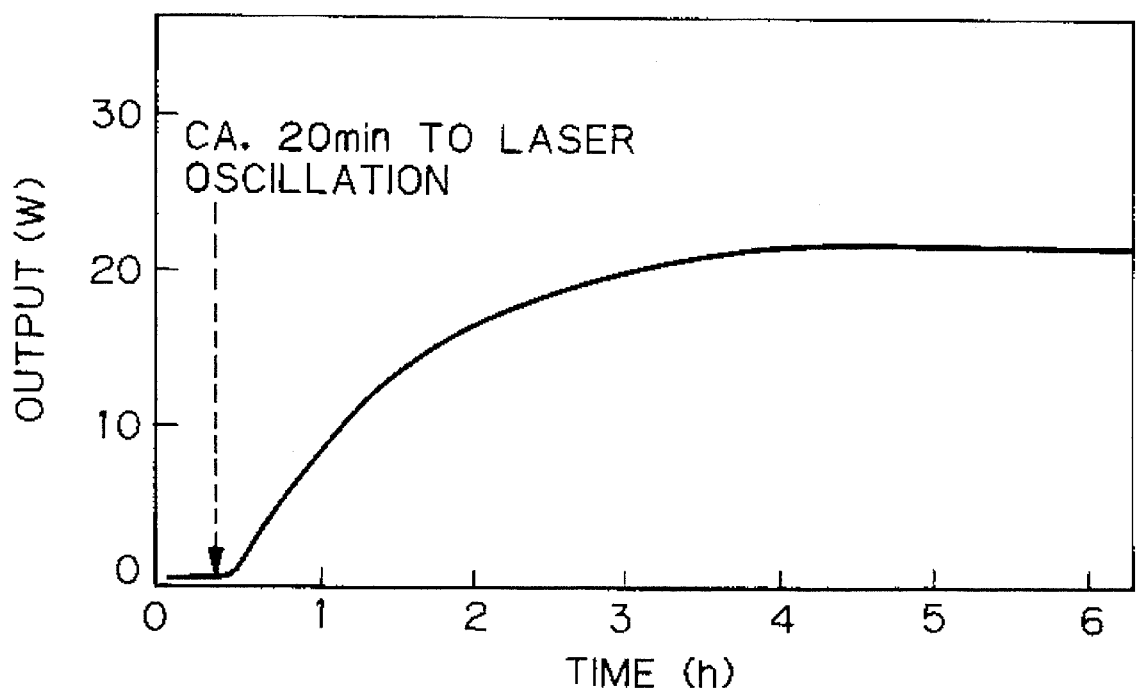
FIG. 3 is a graph showing the time to laser oscillation of the copper vapor laser of the present invention which is capable of cold operation.

FIG. 2 shows the lapse of time from the start of electric discharge in a conventional hot-operating copper vapor laser to laser oscillation. FIG. 3 shows the lapse of time from the start of electric discharge in the cold-operating copper vapor laser of the present invention to laser oscillation. Both lasers used a laser tube of about the same size which was supplied with about the same quantity of electric power. The conventional hot-operating laser took about two hours before laser oscillation occurred; on the other hand, the time to laser oscillation in the cold-operating laser of the present invention is reduced by about one-fifth, thereby enabling laser oscillation to take place in about 20 min. Thus, it is clear that the operational efficiency can be improved by using the laser of the cold-operating present invention.

Figure 4:
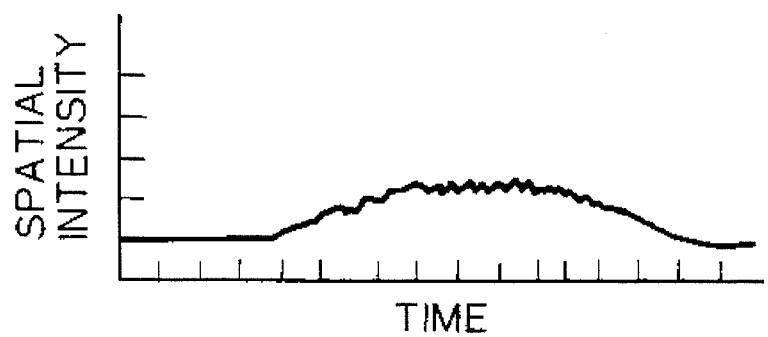
FIG. 4 is a graph showing the spatial intensity distribution of a conventional copper vapor laser for hot operation.
Figure 5:
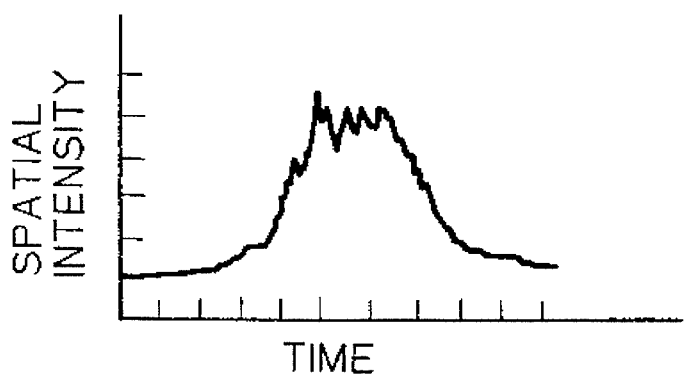
FIG. 5 is a graph showing the spatial intensity distribution of the copper vapor laser of the present invention which is capable of cold operation.

FIG. 4 shows the spatial intensity distribution of the conventional hot-operating copper vapor laser, and FIG. 5 shows the spatial intensity distribution of the cold-operating copper vapor laser of the present invention. As one can see by comparing the two figures, the conventional laser has a fairly flat spatial intensity distribution curve whereas the laser of the present invention has a profile that is markedly high in the central portion than at either end. Hence, in the case where laser light need be focused to a spot, the laser of the present invention will provide the more appropriate spatial intensity distribution of laser light.

In accordance with the present invention, metal vapors can be generated at low temperatures and, hence, laser oscillation can be effected easily within a short time. As a result, the laser equipment can be simplified in construction to enable the fabrication of the laser tube at a lower cost.

What is claimed is:

1. A method for generating a metal vapor in order to form a metal vapor laser, the method comprising the steps of:

generating an electric discharge in a laser tube in which a metal is placed, said discharge being generated in the presence of a halogen gas or a hydrogen halide gas;

reacting the metal within the laser tube with the halogen or hydrogen halide gas to produce a compound of a metal halide;

dissociating the metal halide compound in the laser tube by the electric discharge to obtain metal atoms;

vaporizing the metal atoms within the laser tube; and exciting the vaporized metal atoms with the electric discharge to cause a laser oscillation;

wherein said steps of producing the metal halide compound, dissociating the metal halide compound, vaporizing the metal atoms and exiting the vaporized metal atoms are accomplished through one of plasma etching and electric discharge within the laser tube while continually maintaining a temperature below the boiling point of the metal, thereby increasing the probability for a population inversion and the efficiency of the laser oscillation.

2. The method recited in claim 1, wherein a laser beam having a narrow focus is obtained.

3. A method for generating a laser beam comprising:

introducing a reactive gas into a laser tube, the tube having a metal disposed therein; and causing an electric discharge to be effected through the gas within the laser tube, the discharge generating a plasma from the gas;

plasma etching the metal to form a vaporous metallic compound which is suspended within the tube, and simultaneously decomposing the compound to provide vaporized atoms of the metal; and exciting the vaporized atoms of the metal with the electric discharge to cause laser oscillation;

wherein said steps of decomposing the compound and exiting the vaporized atoms are accomplished while continually maintaining a temperature below the boiling point of the metal, thereby increasing the probability for a population inversion and the efficiency of the laser oscillation.

4. The method recited in claim 3 comprising the further step of maintaining the interior of the tube at a constant gas pressure.

5. The method recited in claims 3 or 4, the gas selected from the group consisting of a halogen gas and a hydrogen halide gas.

6. A metal vapor laser comprising:

a laser tube having first and second ends;

a metal piece disposed within said tube;

a gas inlet means disposed adjacent said first end;

a gas outlet means disposed adjacent said second end; and a first electrode and a second electrode disposed within said tube adjacent said ends such that an electric discharge may be effected between said first electrode and said second electrode;

wherein said metal piece is disposed between said first and second electrodes within said tube such that metal atoms are vaporized at a low temperature below a boiling point of said metal piece by plasma etching based on the electric discharge between said electrodes, thereby increasing the probability of a population inversion and the efficiency of said laser tube.

\* \* \* \* \*